(No Model.)
E. THOMSON.
ELECTRIC RIVETING.
No. 555,131. Patented Feb. 25, 1896.
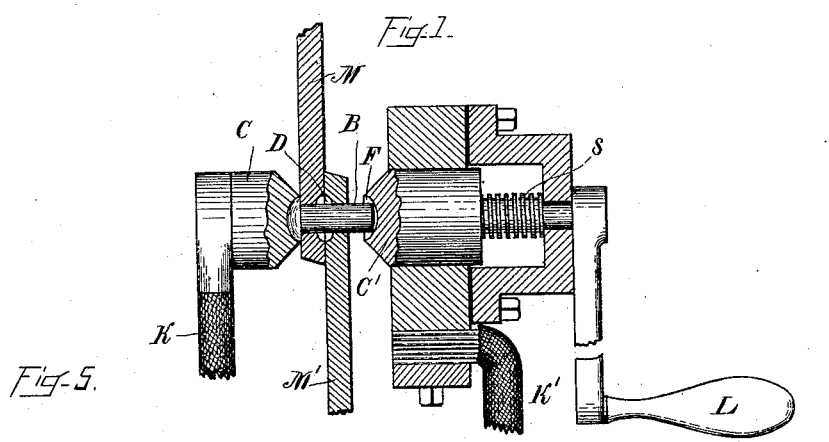
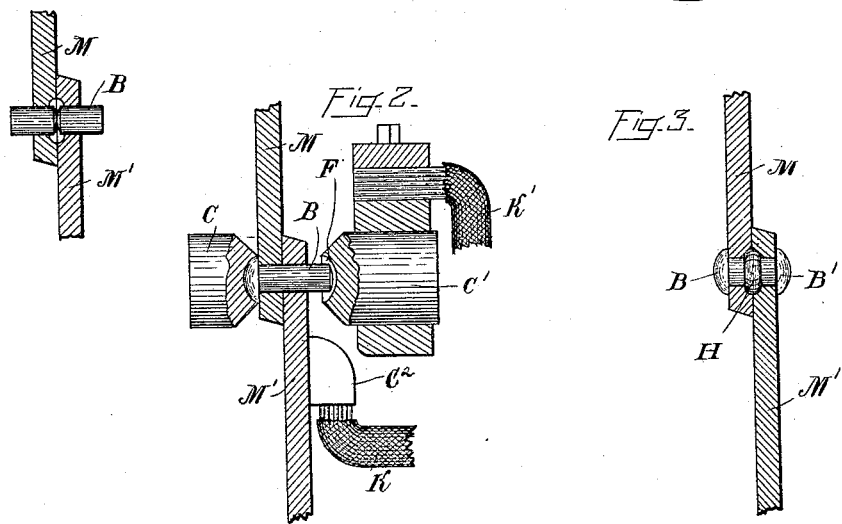
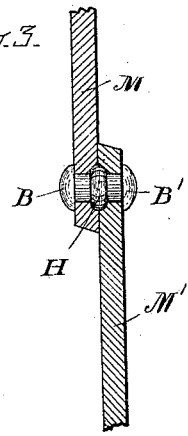
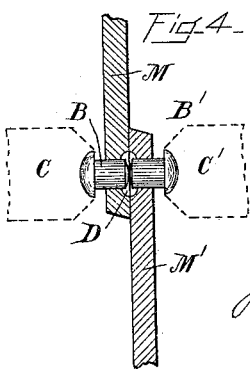
Witnesses:
A. F. Macdonald
John W. Gibboney
Inventor:
Elihu Thomson
By H. C. Townsend
Atty.
ANDREW B. GRAHAM, PHOTO-LITHO, WASHINGTON, D.C.

UNITED STATES PATENT OFFICE.

ELIHU THOMSON, OF SWAMPSCOTT, MASSACHUSETTS, ASSIGNOR TO THE THOMSON ELECTRIC WELDING COMPANY, OF MAINE.

ELECTRIC RIVETING.

SPECIFICATION forming part of Letters Patent No. 555,131, dated February 25, 1896.

Application filed October 20, 1890. Serial No. 368,666. (No model.)

*To all whom it may concern:*

Be it known that I, ELIHU THOMSON, a citizen of the United States, and a resident of Swampscott, in the county of Essex and State of Massachusetts, have invented certain new and useful Electric Riveting, of which the following is a specification.

My invention relates to the manner of riveting two plates or pieces of metal or other material together by means of a pin or rivet.

The invention is an improvement upon riveting plates or parts together when a recess or countersink at their meeting faces adjacent to the opening which receives the pin or rivet is provided for the purpose of allowing an enlargement which enters or fills the cavity or countersink and thus furnishes an additional resistance to shearing. Preferably I produce the expansion into the cavity formed by the countersink by applying end pressure after the rivet has been heated by the passage of an electric current, as now well understood in the art.

My invention consists, first, in making the rivet in two parts, which are placed in position in the rivet-hole with their ends abutting and are then subjected to end pressure.

My invention consists, also, in a particular process of riveting, as hereinafter described and claimed.

In order that my invention may be more readily understood, I will describe it as carried out by the process of electric riveting.

In the accompanying drawings, Figures 1 and 2 illustrate electrical riveting. Fig. 3 illustrates the completed joint. Figs. 4 and 5 illustrate rivets employed in my improved process.

Fig. 1 shows the ordinary way of electrical riveting as applied to the riveting of two plates provided with a countersink at their meeting faces.

C C' are heading-tools or abutments adapted to receive the rivet between them, and connected, respectively, by cables K K', or by other means, with a source of heavy electric currents. One of the heading-tools or abutments, as C', is mounted as a slide in a block of conducting material and is provided with a rear-pressure screw S, that may be operated by a handle L for the purpose of moving the abutment or heading-tool C' against the end of the rivet or pin B, so as to apply end pressure to the same.

M and M' indicate two plates or pieces of metal or other material which are to be fastened together by the pin or rivet B. One or both of said plates or pieces of metal are countersunk or recessed on their meeting faces adjacent to the hole which receives the pin or rivet B, thus forming a cavity or recess D.

The two abutments or tools C C' may have their faces which engage with the rivet either plain or recessed, according to the shape which it is desired to give to the headed rivet end. If there be a countersink provided on the external face of the plates or pieces the heads of the blocks C C' might be plain, and that one which is used for heading the rivet would then act simply to force or squeeze the upset end into the countersink.

In Fig. 1 the rivet is supposed to be primarily headed at one end only before being placed in the rivet-hole. After being placed in position, as shown, with the back head or tool C held firmly in position against the headed end of the rivet the other tool or block, C', is forced against the opposite or plain end by means of a screw S, and the rivet being at the same time heated by the passage of the electric current through it and softened thereby the pressure applied will not only press up and form the head F, so that it will assume the shape illustrated in Fig. 3, but will also upset the metal of the rivet or pin contiguous to the cavity D, so as to force it to mass together in such space or cavity and form an upset or expanded rib or enlargement at that point.

The result of the whole operation is indicated in Fig. 3, where the plates are bound together by the heads of the rivet or pin, while the expanded portion H in the interior serves to prevent shearing of the rivet in case strain tending to separate the plates M and M' in a direction transverse to the rivet or pin is applied.

As the actual mass of metal removed between the plates M and M' for the reception of this expansion is quite slight the strength of the plates need not be affected to any considerable extent, while at the same time the resistance to shearing strength is greatly increased. In practice I find it not difficult where the resistance of a rivet to shearing strain is, say, four thousand (4,000) pounds to add one thousand (1,000) pounds or thereabout to the strain, which it will stand without shearing.

Fig. 2 shows my improved process of electric riveting, wherein the current is passed through the rivet by making contact with one of the plates or pieces M M' by means of a block or plate $C^2$ of suitable superficial contact-surface and by making contact with the end of the rivet to be headed by means of another contact, as C'. In this instance the block C may be of insulating material. This method of applying the current to heat the rivet is of especial advantage where the surfaces of the plates to be joined are of great area, since it permits the two poles of the source of current to be located on the same side of the structure, whereas if the surfaces were large it would be necessary to carry one pole by a flexible conductor around the edge of the structure, a proceeding which is objectionable as making it necessary to use a very large amount of heavy conductor in order to properly carry the heavy currents employed in the operation.

Instead of having one end of the pin or rivet headed before placing it in position it is obvious that such rivet might be a plain rivet or pin and the heading of both ends accomplished at the same time with the upsetting of the intermediate portion.

My present invention consists among other things in making the rivet in two parts, as indicated in Fig. 5, the ends of the two parts being abutted at the cavity or recess between the plates or pieces M M'. The application of the pressure and heat would in this case unite the two ends or parts to form a complete rivet by electrically welding the said abutting ends together, and would also at the same time produce the swell or expansion which would fill the cavity or countersink and produce practically the same result as is indicated in Fig. 3.

As will be seen, the rivet, previously to the heating operation, is reduced in cross-section at or near its middle, where the heating and expansion take place. This is especially desirable where the electrical process is employed, as the resistance to the passage of the current in the operation indicated in Fig. 1 is thereby made greater at the point where the heating is desired, and the heating is thereby facilitated.

The two ends or parts of the rivet might be provided with heads before placing the same in the rivet-hole. This modification is indicated in Fig. 4. In this instance the application of the pressure simply brings the ends of the rivet down to place against the outside of the plates M M', and at the same time unites the two parts of the rivet at the central portion and forms the expansion thereat to give the increased resistance to shearing strain.

In all the cases heretofore mentioned it is to be understood that the metal is to be rendered plastic by the application of the heating electric current, and this is the preferred way of carrying out my invention.

What I claim as my invention is—

1. The herein-described improvement in electric riveting, consisting in placing a two-part rivet-blank in position with the parts abutting within the pieces to be fastened together, passing an electric current through such abutting portions, and then subjecting the same to endwise pressure so as to weld the two parts together to complete the rivet and at the same time form a head or enlargement to give increased resistance against shearing strain.

2. The herein-described method of fastening two pieces of metal or other material together, consisting in abutting them together with a countersink or cavity formed at their meeting faces around an opening through them, placing two pieces of metal in said opening with their ends abutting at the cavity formed by the countersink, and then subjecting said pieces to end pressure while heated to plasticity so as to unite the abutting ends and form an expansion into the cavity.

Signed at Lynn, in the county of Essex and State of Massachusetts, this 16th day of October, A. D. 1890.

ELIHU THOMSON.

Witnesses:
JOHN W. GIBBONEY,
NORMAN C. BASSETT.